May 19, 1964 A. BRANDES ETAL 3,133,772
LOCKER
Filed Dec. 20, 1960 5 Sheets-Sheet 1

INVENTORS
ARTHUR BRANDES
RICHARD W. SITLER
BY BYRON B. TREMBLE

Fidler Beardsley & Bradley
Att'ys.

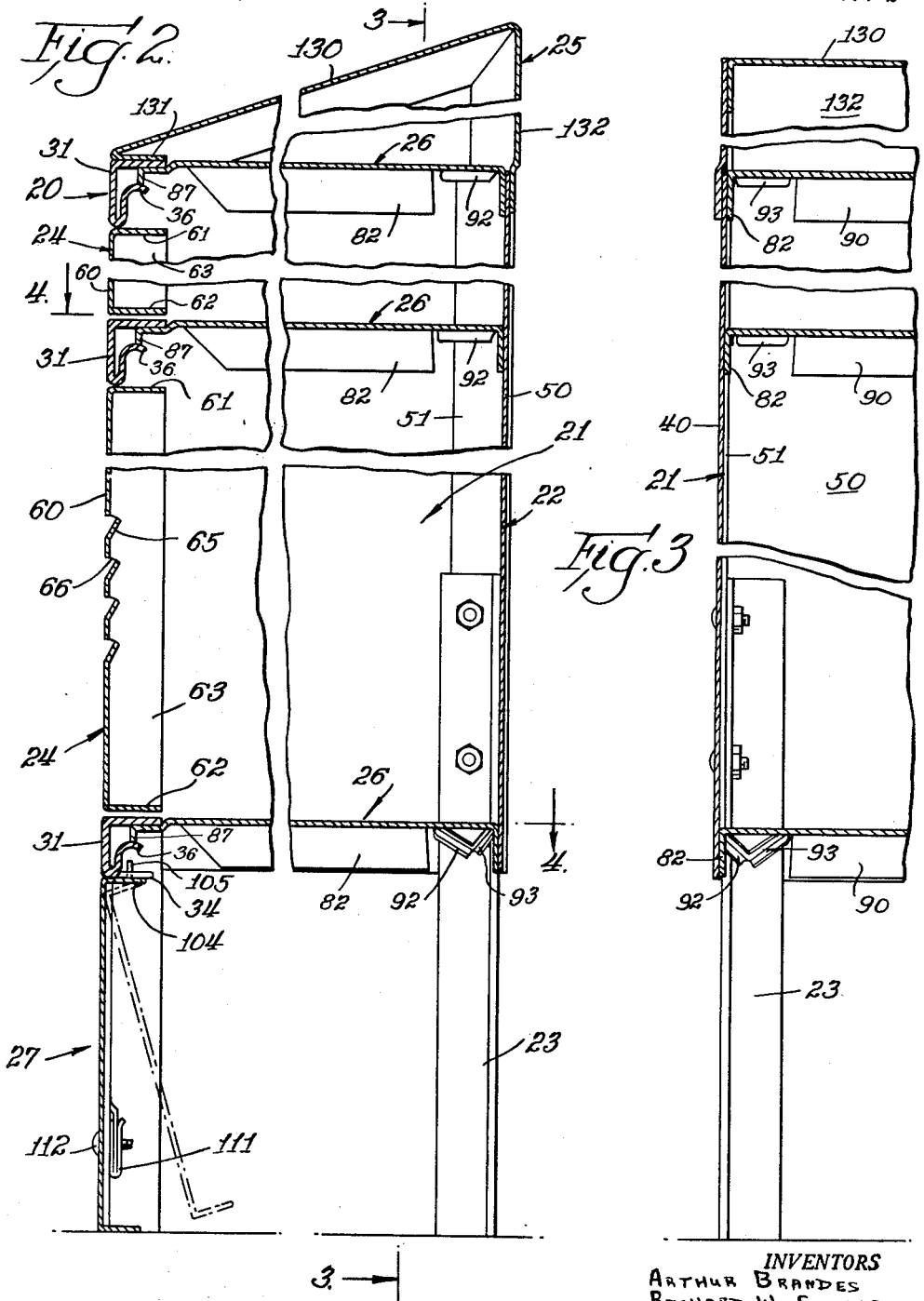

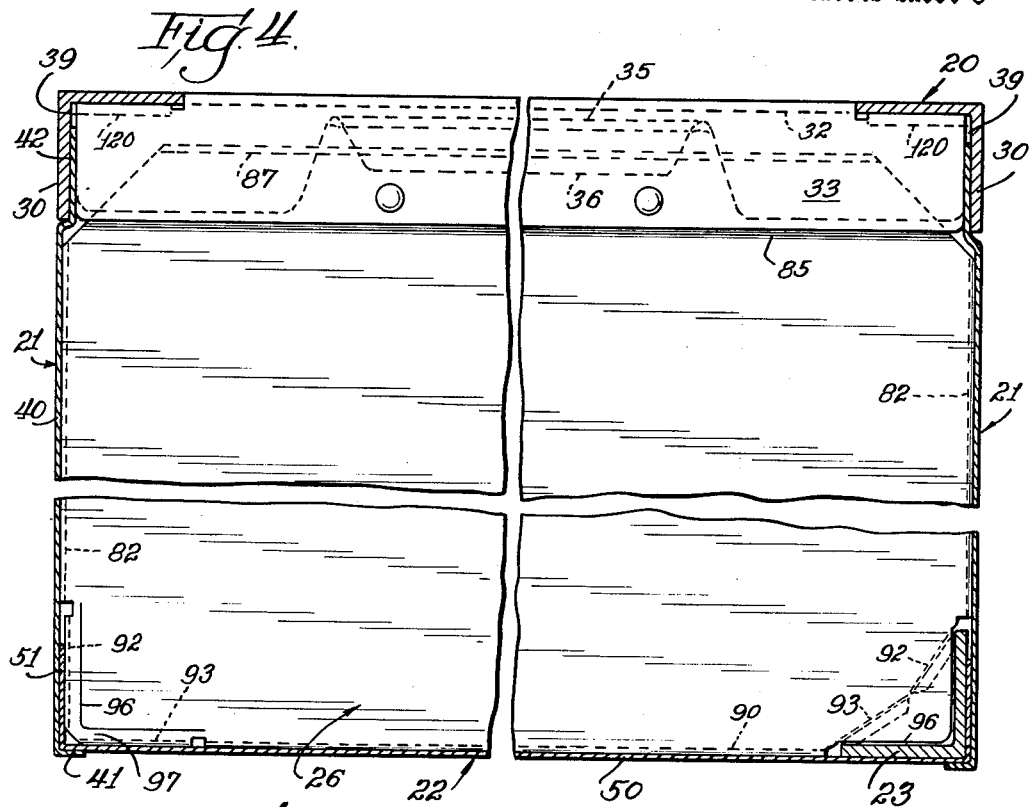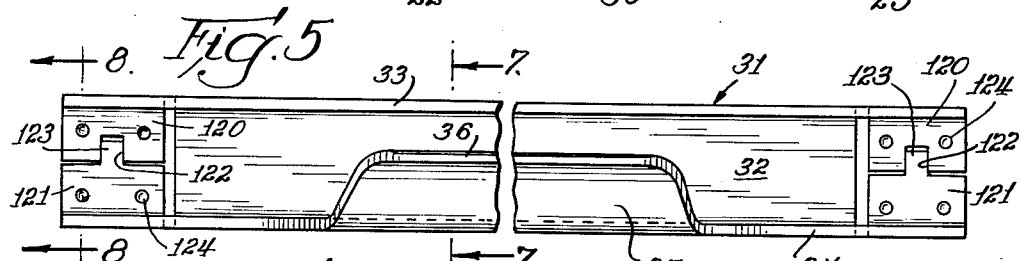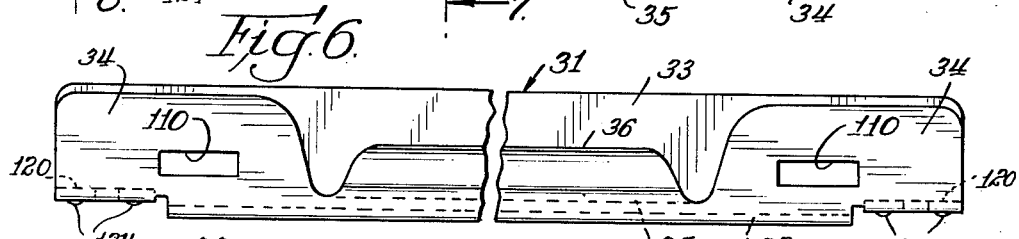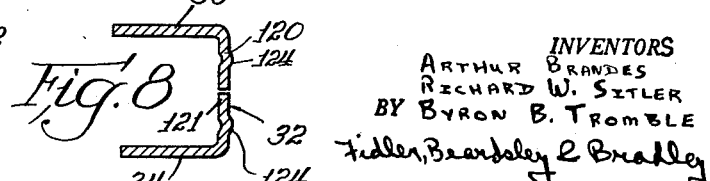

May 19, 1964 A. BRANDES ETAL 3,133,772
LOCKER
Filed Dec. 20, 1960 5 Sheets-Sheet 4
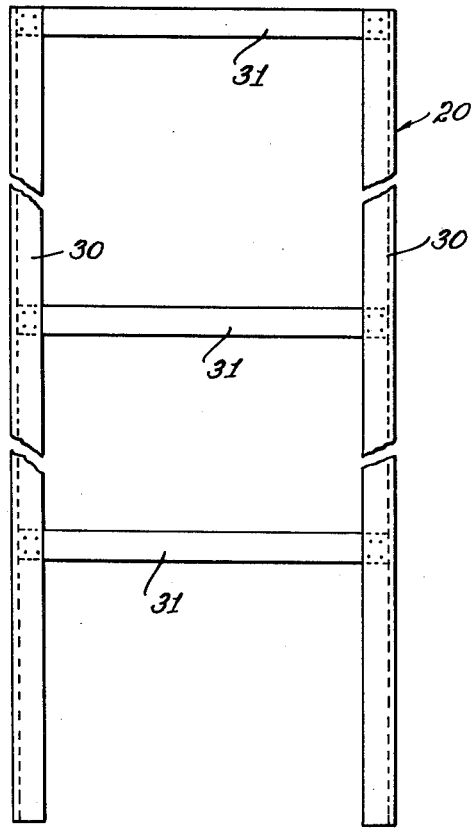
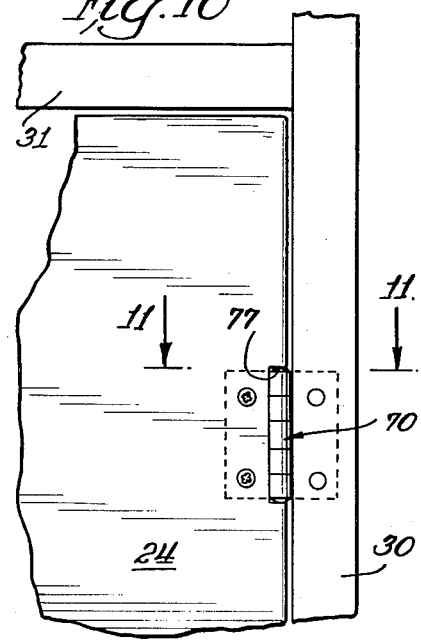
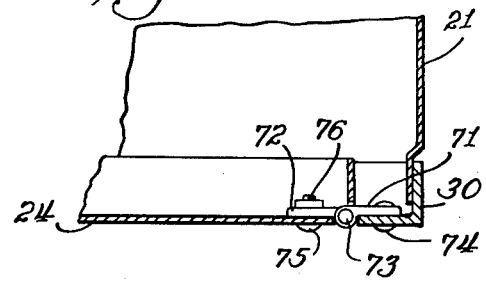
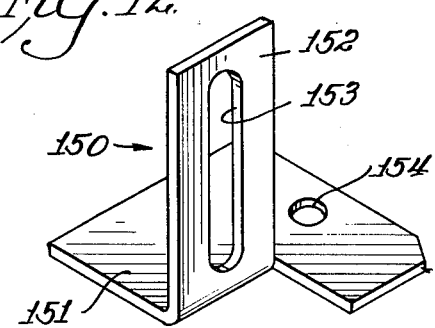
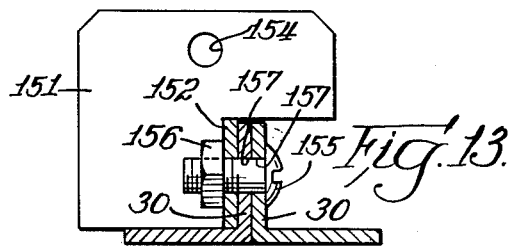
INVENTORS
ARTHUR BRANDES
RICHARD W. SITLER
BYRON B. TROMBLE
BY
Tidley Beardsley & Bradley
Attys.

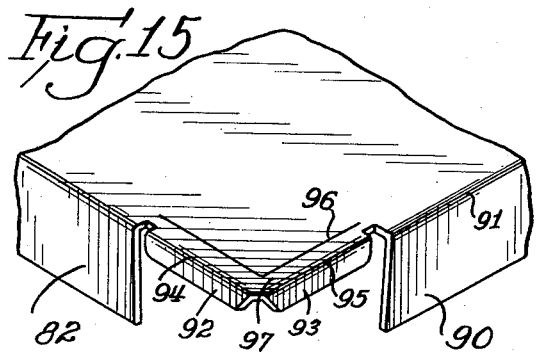
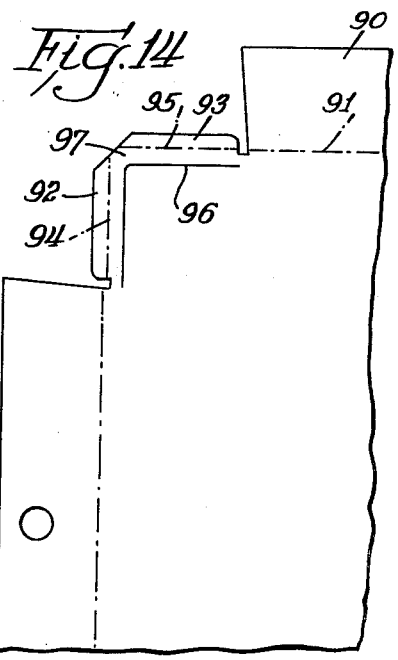
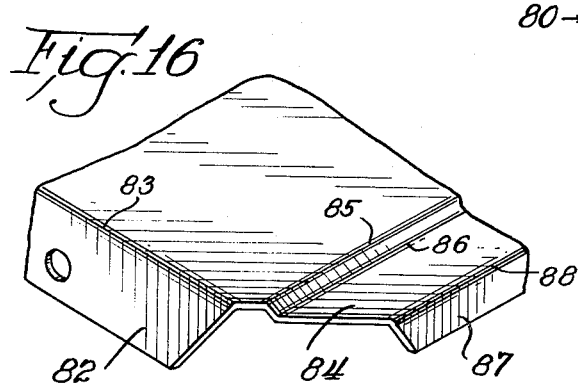
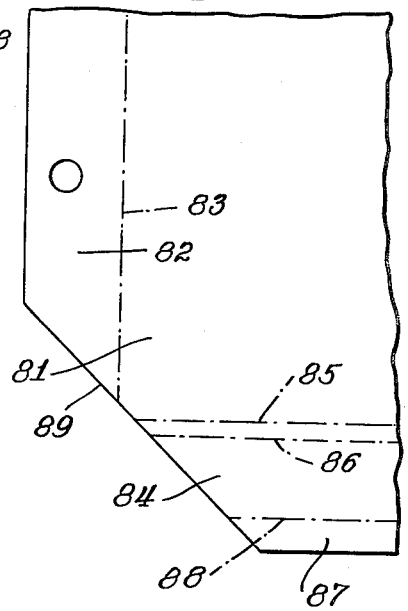
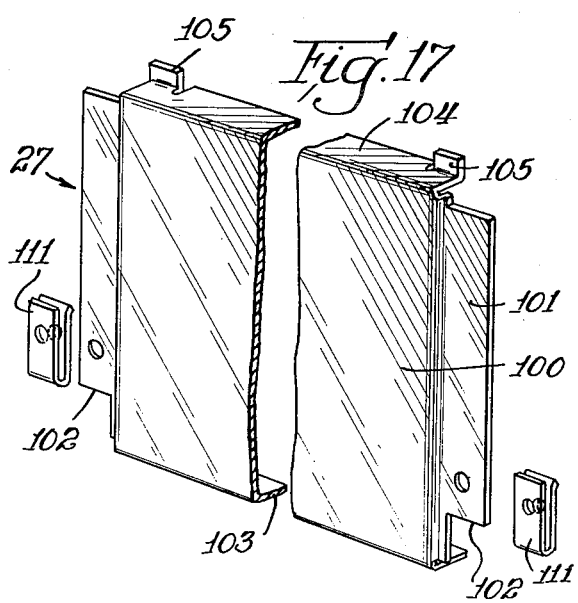

Patented May 19, 1964

3,133,772
LOCKER
Arthur Brandes, Monrovia, Richard Waldo Sitler, Whittier, and Byron Bishopp Tromble, Alhambra, Calif., assignors to Ekco Products Company, Chicago, Ill., a corporation of Delaware
Filed Dec. 20, 1960, Ser. No. 77,194
6 Claims. (Cl. 312—108)

This invention relates to lockers and has to do more particularly with a new and improved metal locker of the type wherein a front frame supports side, top, bottom, and door members.

Metal lockers are known wherein side, top, and bottom wall members or panels are supported by a front frame. However, in such known constructions the frames are so formed that they do not have the desired rigidity and do not strongly support the horizontal members, such as tops, bottom, and intermediate partitions. Also, in prior lockers the closure between the bottom wall of the locker and the floor or other support is fixed to the frame, thus making it difficult to mount the locker on the floor and adjust it relatively to the floor. Moreover, in prior lockers, the louvers provided in the doors for ventilation are of such dimensions and arrangement that they tend to weaken the doors. Furthermore, the doors are so hinged to the frame that a substantial space is left between the hinged edge of the door to accommodate the door hinges, thus making an unsightly construction.

An object is to provide a locker having a frame of simple construction which can be easily and inexpensively formed, is very strong and rigid, and maintains its shape during installation of the locker and during use.

An object of the present invention is to provide a locker having an improved frame for supporting other members forming the locker, which frame has increased strength as compared to the frames of prior lockers.

Another object is to provide a locker having a frame formed of upright members and cross members connected between the upright members, wherein the cross members are so formed that horizontal partition members may be readily connected thereto and supported thereby.

Another object is to provide a locker having a frame including upright members and separately formed cross members extending between and connected between the upright members, wherein the front faces of all the frame members are flush.

Another object is to provide a locker having a frame with reinforced cross members which are so formed that there are no rough or "raw" edges therein, thus insuring against injury to the user in inserting his hands in the locker.

Another object is to provide a locker having a frame which is constructed from a plurality of readily assembled members of only two different, readily formed shapes, thus providing a relatively inexpensive construction.

Another object is to provide a locker of the type having a rigid frame for supporting other locker forming members and wherein is provided a novel horizontal wall member which, when installed, is firmly supported, at least in part, by the frame.

A further object is to provide a locker having a door formed with a plurality of louvers which are of such size and arrangement that there is no substantial weakening of the door face, by reason of its being provided with such louvers.

A further object is to provide a locker having a door formed with a series of louvers of such size and arrangement that they strengthen the door face.

Another object is to provide a locker of the type having a frame supporting doors and top, side and bottom walls or panels, and having a base or bottom closure member of improved construction for closing the space between the bottom wall and the floor or other base upon which the locker is supported.

Another object is to provide a locker having a base or bottom closure member which can be assembled readily with the remainder of the locker either before or after the remainder of the locker has been installed in its final location.

Another object is to provide a base or bottom closure member of such construction that when installed in the frame to close the space between the bottom of the locker and the floor or other base upon which the locker is located, its exposed front face is flush with the adjacent front face portions of the frame.

Another object is to provide a locker wherein the base closure member is of such construction and is so attached to the frame that it can be readily removed and replaced whenever such becomes desirable.

Another object is to provide a locker wherein the locker is supported on the floor or other support by floor plates whereby the height of the locker above the support is readily adjustable.

Another object is to provide a locker having a novel horizontal partition which permits the ready assembly of the partition with the frame and side panels.

Another object is to provide a locker having novel door and hinge construction whereby the door may be made to fit snugly in the frame and with a minimum space between the door and the frame.

Other objects and advantages of the invention will appear from the following description taken in connection with the appended drawings, wherein:

FIG. 2 is an enlarged vertical sectional view taken along line 2—2 of FIG. 1;

FIG. 3 is a vertical sectional view taken along line 3—3 of FIG. 2;

FIG. 4 is an enlarged horizontal sectional view taken along line 4—4 of FIG. 2;

FIG. 5 is a front elevational view of one of the cross members of the frame;

FIG. 6 is a top plan view of the cross member of FIG. 5;

FIG. 7 is a transverse sectional view taken along line 7—7 of FIG. 5;

FIG. 8 is a transverse sectional view taken along line 8—8 of FIG. 5;

FIG. 9 is a front elevational view of the frame;

FIG. 10 is an enlarged fragmentary elevational view showing particularly the door hinge arrangement;

FIG. 11 is a fragmentary horizontal sectional view taken along line 11—11 of FIG. 10;

FIG. 12 is a perspective view of a floor plate or foot;

FIG. 13 is a fragmentary, horizontal sectional view showing the floor plate assembled with two adjacent lockers;

FIG. 14 is a fragmentary, top plan view of a blank used in forming the horizontal plate members of the locker;

FIG. 15 is a fragmentary, perspective view of a portion of one of the horizontal plate members and showing particularly a rear corner portion thereof;

FIG. 16 is a fragmentary, perspective view of a portion of one of the plate members and showing particularly a front corner portion thereof; and FIG. 17 is a perspective view of the bottom closure plate and two spring nuts adapted to be assembled therewith.

Figure 1:
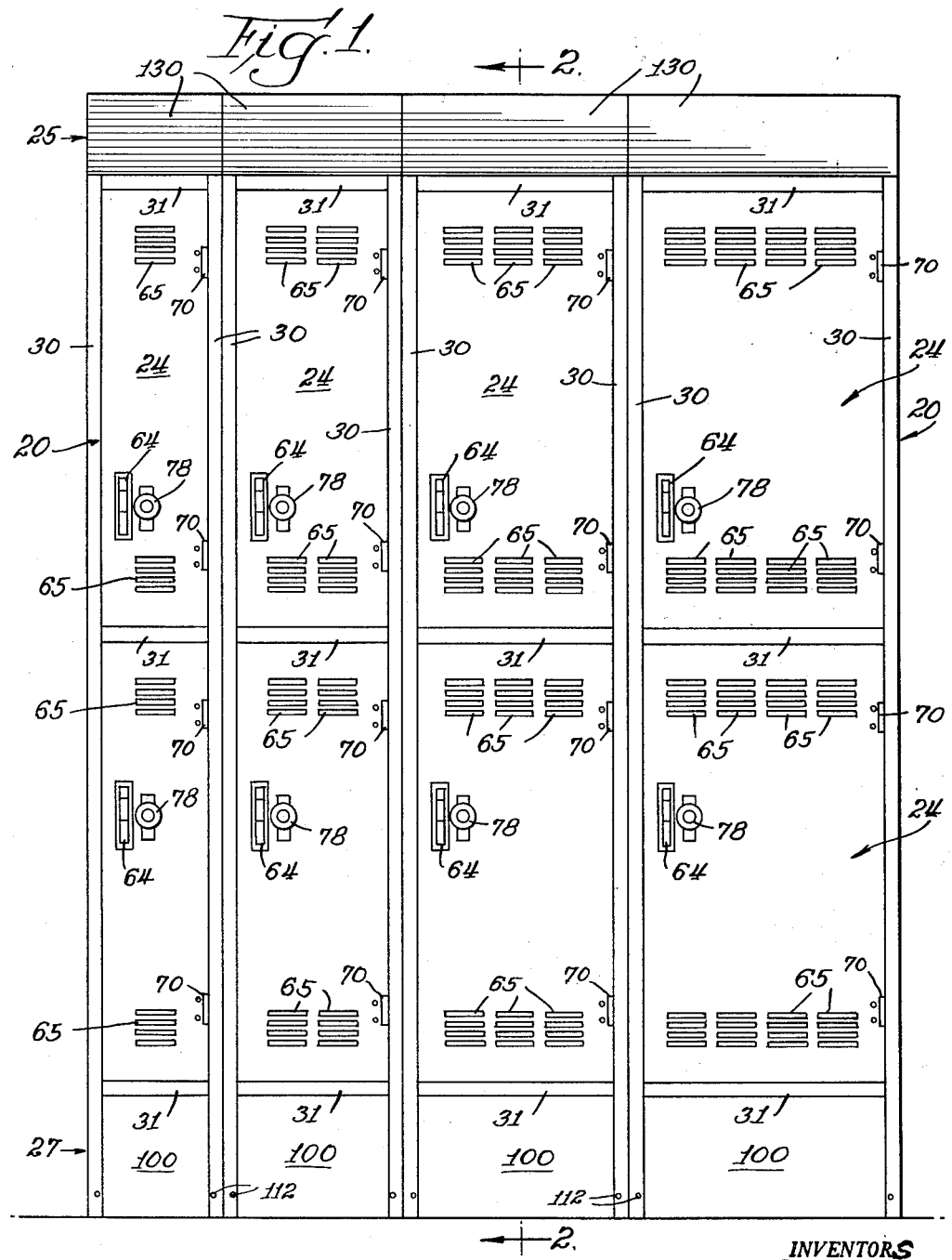
FIGURE 1 is a front elevational view of a plurality of assembled locker units, each constructed in accordance with the present invention.

The locker of the present invention comprises generally a frame 20 (FIG. 2), a pair of side members or panels 21, a rear member or panel 22, legs 23, doors 24, a top 25, horizontal plates or partition members 26, and a bottom or base closure plate 27, all of which members and their respective relationships are described in more detail hereinafter.

The frame 20 (see particularly FIGS. 1, 2, 4, and 9) includes a pair of spaced upright or vertical members 30, each preferably formed as an angle iron, and a plurality of cross members 31 extending between the upright members 30, and secured thereto, as by welding, in a manner more particularly described hereinafter. Preferably, the cross members are located, respectively, at the tops of the vertical members 30, at a point about midway between the tops and bottoms of the upright members 30, and at a point spaced above the bottoms of the upright members 30. Thus, a generally rectangular frame is provided which is self-bracing and of rigid construction. It will be understood that the frame is located at the front of the locker and serves as the primary supporting means for the other members forming the locker, as will be seen particularly from FIG. 2 of the drawings.

The cross members or channels 31 (see FIGS. 5 to 8) may be all formed in an identical manner but, preferably, the bottom member (FIG. 2) is of slightly different construction from the other members, as will be described hereinafter. Each cross member 31 is of generally channel shape and includes a vertical web 32 having horizontal flanges 33, 34 extending therefrom. The upper flange 33 preferably is a plain flange extending rearwardly from the web. The bottom flange 34 is provided with a central section 35 which is cut out from the remainder of the flange and is folded back toward the web 32, as shown particularly in FIG. 7 of the drawings, the upper and free end 36 of such portion being curved outwardly away from the web 32. The free end 36 is spaced from and parallel to the upper flange 33 and serves to support the corresponding partition member 26 in a manner hereinafter described.

In order to provide accommodation for the uprights 30 so that the forward faces will be flush with the forward face of each of the cross members 31, each cross member is provided with an inset portion at each end, as shown particularly at FIG. 6. This inset portion is formed by tonguelike end portions or tongues 120, 121 extending downwardly from the upper flange 33 and upwardly from the lower flange 34, respectively, in parallel relation with the web 32, which end portions 120, 121 are offset inwardly from the plane of the web 32. Preferably, the tongues 120, 121 are maintained in aligned position for welding to the corresponding uprights 30 by providing a notch 122 in one of the tongues 120 and a projection 123 on the other tongue 121 dimensioned to fit in the notch 122. The cross member 31, after being formed in a manner hereinabove described, is secured to the forward flange of the upright member 30, as by welding, indented portions 124 being provided in the tongues 120 and 121 to aid in the welding operation. The welding operation preferably is carried out while the upright and cross members are held in a suitable welding fixture (not shown) which maintains the cross members in right-angle relation to the uprights and in close abutting relation.

The ends of the cross members 31 terminate short of the side flanges of the uprights 30 to leave a slight space 39, as seen in FIG. 4, the purpose of which will be described hereinafter.

The side members or panels 21 (FIG. 4) are of generally platelike form and each includes a planar main or body portion 40, a rear flange 41, and a forward portion 42 offset from and parallel to the plane of the body portion 40. The side members 21 are secured to the frame by inserting the offset portions 42, respectively, in the spaces 39 between the ends of the cross members 31 and the adjacent upright 30, as seen particularly in FIG. 4, and are secured to the side flanges of the adjacent uprights as by bolts and nuts (not shown).

The rear member (FIG. 4), or panel 22, which is of platelike form, includes a planar body portion 50 and side flanges 51. The rear member 22 is assembled with the side members 21 by inserting it within the flanges 41 of the side members 21 and securing it to the side members as by bolts and nuts (not shown). Thus, it will be seen that the frame 20, the two side members 21, and the rear member 22 form a rigid, self-supporting structure adapted to support the other members of the locker, which will now be described.

The locker is provided with one or more, and preferably a plurality, of doors 24. Each door (FIG. 2) includes a planar body portion 60 having a top flange 61, a bottom flange 62, and two side flanges 63, inturned from the body member at right angles. One side flange provides means for attaching to the door a portion of the latching mechanism indicated generally at 64, the remaining portion of which (not shown) is attached to the front flange of the adjacent upright 20. The latching mechanism forms no part of the present invention and, hence, is not shown or described in detail herein.

Louver means consisting of one or more horizontally spaced columns of vertically spaced louvers 65, is provided in each door for ventilating the interior of the locker. The numbers of columns of louvers will depend upon the width of the door and, as illustrated in FIG. 1, one or more columns may be provided.

Each louver is formed by slitting the body portion of the door horizontally and displacing the metal below the slit inwardly, as shown particularly in FIG. 2, to provide a narrow louver opening 66 between the body of the door and the edge of the displaced material 65. The opening extends only across the top of the louver, and the displaced portion 65 is connected at both its bottom and side edges to the adjacent portions of the body 60 and thus the formation of the louver does not substantially reduce the strength of the door. Moreover, the width of each individual louver and the width of the total extent of the louvers in a door are such that the door is not weakened by reason of the provision of the louvers but, in fact, the construction is such that it tends to strengthen the door because of the reinforcing action of the displaced metal.

While the dimensions of the louvers are not sharply critical, it is important that the width of each louver, the height of the displaced material, and the spacing between adjacent louvers be so selected as to insure that the louvers do not substantially weaken the door. These dimensions, of course, will depend upon the thickness of the material from which the door is formed.

In one specific representative embodiment of the invention the doors were formed from sheet metal approximately 1/16" in thickness. Each louver was approximately 2¾" in width and approximately ⅜" in height, with the edge of the louver indented a distance of approximately ⅛" from the body of the front panel of the door; adjacent louvers were spaced apart vertically a distance of approximately 5/16". In an embodiment having a plurality of spaced columns of louvers, the louvers of adjacent columns were spaced apart approximately ¾".

Each door is pivotally supported on the frame 20 by a hinge 70 (FIG. 10), which preferably takes the form of a piano hinge. The hinge 70 includes cooperating leaves 71 and 72 pivotally connected by a pin 73 in the usual manner employed in forming piano hinges. The leaf 71 of the hinge is secured to the front flange of the upright 30 as by rivets 74, and the leaf 72 is secured to the door preferably by bolts 75 and nuts 76 (FIG. 11). In order to permit the edge of the door, which is adjacent the upright 30, to be placed closely adjacent the upright 30 and to eliminate any substantial space between the edge of the door and the adjacent portion of the upright 30, the door at the junction of the body and the flange is notched as at 77 to accommodate the bearing portions or knuckles of the hinge leaves and the hinge pin, as shown particularly in FIGS. 10 and 11.

Each door preferably is provided with a lock 78 of any suitable construction, which lock is not shown in detail, as it forms no part of the present invention.

The several horizontal partitions or plates 26 are preferably identical in construction except in one minor respect, which is explained hereinafter.

The horizontal partitions or plates 26 are secured to the respective cross members 31 of the frame and to the side and rear members or panels by bolts and nuts (not shown). They thus serve as horizontal walls or partitions of the structure and to brace and reinforce the structure provided by the frame 30, the side panels 21, and the rear panel 22. The top horizontal member 26 serves as a top wall, closing the locker, and therefore it is not necessary in all cases to use a top such as the top 25, although it is usually preferable to use such member to improve the appearance of the locker. The intermediate member 26, or interbottom, divides the locker into upper and lower sections, entry to each of which is provided by the upper and lower doors 24, respectively. The lowermost horizontal member, or bottom 26, closes the bottom of the locker, as seen particularly in FIG. 2 of the drawings, such member being spaced above the floor on which the locker is located. It will be seen that the horizontal members 26, in cooperation with the associated members, provide a completely enclosed locker space which, in the embodiment shown, is divided into upper and lower compartments.

Each of the horizontal members 26 is formed from a blank 80 (FIG. 14) of planar form, having a main panel 81. Side panels 82 extend laterally from the main panel 81 and are adapted to be bent down at right angles along parallel lines 83 to provide side flanges whereby the horizontal member 26 may be secured to the side walls or panels 21, as by bolts and nuts (not shown).

The forward portion of the blank 80 is formed with a front panel 84 adapted to be offset downwardly in parallel relation with the main panel 81 along lines 85 and 86, and the outer marginal portion 87 of the front panel is adapted to be bent down at right angles along the line 88 to form a forward flange.

The forward corners of the blank 80 are cut off at an angle of preferably 45 degrees, providing edges 89 in order to permit ready assembly of the horizontal member 26 with the frame, as seen particularly in FIG. 4 of the drawings.

The blank 80 has a rear panel 90 adapted to be folded down along a line 91 to form a rear flange for securement to the rear wall or panel 22 by bolts and nuts (not shown).

The side flanges 82 and the rear flange 90 terminate short of the rearward corners of the blank, as seen particularly in FIG. 14. Small panels 92 and 93 extend from the edges of the blank and are adapted to be folded down along lines 94 and 95 to form small corner flanges which are spaced, respectively, from the rear flange 90 and the adjacent side flange 82. The fold lines 94 and 95 are offset inwardly from the lines 83 and 91, respectively, a distance equal to the thickness of the material forming the rear panel 22 to accommodate the flange 51 of the rear panel 22 when the locker is assembled, as seen particularly in FIG. 4 of the drawings and as hereinafter explained.

The blank 80 also is formed with a slit 96 of right-angle form extending parallel to the fold lines 94 and 95, whereby the material outwardly of the slit 96 may be bent downwardly out of the way to provide a corner portion of smaller dimensions than where such portion is not bent downwardly. This reduced corner portion is provided in order that the lower horizontal member 26 may accommodate the legs 23 when the locker is assembled, as seen particularly in FIGS. 2, 3, and 4, and as explained hereinafter.

After each horizontal member 26 is formed from the blank 80, as above described, it is assembled with the frame by inserting the forward flange 87 in the space between the upper flange 33 of the corresponding cross member 31 and the tongue 36, and the offset portion 84 of the horizontal member 26 is secured to the upper flange 33 of the cross member 31 in a suitable manner, as by bolts and nuts (not shown). The forward flange 87 of the horizontal member 26 rests upon the member 36 and, thus, the horizontal member 26 is strongly and firmly supported and is capable of bearing considerable weight.

The side flanges 82 of the horizontal member 26 are secured to the side panels 21, respectively, in a suitable manner, as by bolts and nuts (not shown), and the rear flange 90 is secured to the rear panel 22 in a similar manner.

At the rear portion of the locker it is supported on the legs 23, which preferably are formed as angle members and are secured at their upper ends to the flanges 51 of the rear panel 22 in suitable manner, as by bolts and nuts. The legs 23 extend downwardly so as to rest on a floor plate (hereinafter described) in alignment with the lower ends of the uprights 30 of the frame 20.

The legs 23 preferably extend only a slight distance above the bottom horizontal member 26. In order to permit the insertion of the legs 23 between the bottom horizontal member 26 and the rear panel 22, the portion 97 of the bottom horizontal member is bent downwardly out of the way, as seen particularly in FIGS. 2 and 3, so that the legs 23 can be inserted between the reduced corner portion of the bottom horizontal member 26 and the rear panel 22, as seen particularly at the right-hand side of FIG. 4 of the drawings.

A floor plate 150 (FIG. 12) is provided for attaching each upright of the frame to the floor or other base upon which the locker is supported. The floor plate 150 includes a body portion 151 and an upstanding flange 152 having an elongated vertical slot 153. The body portion 151 preferably is provided with an opening 154 for receiving a screw (not shown) or other fastening means for securing the floor plate to the floor.

The upright 30 of the locker is secured to the vertical flange 152 by suitable means, such as a bolt 155, extending through a suitable opening 157 (FIG. 13) in the upright and the slot 153 and secured by a nut 156. The vertical slot 153 permits vertical adjustment of the frame relative to the floor plate 150, whereby the locker can be located in the deisred position relative to the floor.

Where two locker sections are assembled in side-by-side relation, as shown in FIG. 1, the adjacent uprights 30 of the two adjacent lockers are both secured to the vertical flange 152 of the corresponding floor plate 150, as illustrated particularly in FIG. 13. On the other hand, where the floor plate supports only a single upright, the latter only is secured to the vertical flange 152.

The space between the lower cross member 31 of the frame and the floor is closed by the bottom or base closure plate 27, as shown in FIG. 2, the bottom closure plate being shown in more detail in FIG. 17.

The bottom closure plate 27 includes a front panel 100 with side panels 101 extending laterally from the vertical edges and offset rearwardly so as to lie in a plane displaced rearwardly from and parallel to the plane of the front or main panel 100. The side panels 101 terminate short of the bottom, as shown at 102, in order to clear the floor plates which are secured to the lower portion of the upright 30 of the frame 20 and the securing bolt and nut when the bottom closure plate is swung into position.

A bottom flange 103 extends rearwardly from the bottom of the front panel 101 and is adapted to rest on the floor when the floor plate is in its normal position, closing the space between the lowermost horizontal member 26 and the floor.

At its upper end, the bottom closure plate 27 is provided with a flange 104 extending rearwardly from the main panel 100 and having upstanding tongues 105 adjacent its end edges.

The bottom closure plate 27 is adapted to be inserted in position between the lowermost cross member 31 of the frame 30 to close the space between the lowermost cross member 31 and the floor. To this end, the lowermost cross member 31 is provided with slots 110 (FIG. 6) in its lower flange adapted to receive the tongues 105 of the bottom closure plate 27. In this respect the bottom cross member 31 differs from the other cross members. If desired, all of the cross members may be formed with the slots but, in order to minimize expense, only the bottom cross member, preferably, is so formed.

After the locker has been assembled and placed in position, the bottom closure plate is assembled therewith by inserting the tongues 105 in the slots 110 and rocking the bottom closure plate into its above-described position, closing the space between the bottom cross member 31 and the floor. Prior to the insertion of the bottom closure plate in position, a pair of spring nuts 111 (FIG. 17) are applied to the bottom portions of the side panels 101, respectively, which spring nuts are retained frictionally on the side panels 101. After the bottom closure plate has been moved into position with the side panels 101 abutting the corresponding uprights 30 (FIG. 2), screws 112 are inserted through holes in the bottom closure plate, the side panels 101, and the spring nuts 111 to secure the bottom closure plate in position.

The top member 25 is formed with a main portion 130 which may be of any form but preferably is inclined downwardly and forwardly and has, at its forward edge, a reversely bent inturned flange 131 by which the top member may be secured to the top cross member 31 of the frame 30. At its rearward portion the top member 25 has a depending rear wall 132 adapted to fit down over the rear wall 22 and is secured thereto in a suitable manner.

From the foregoing, it will be seen that the present invention provides a locker of relatively simple and inexpensive construction but which is very rigid and stable and not subject to distortion during installation or use. The provision of the frame with the horizontal members and the wall members and other members associated therewith provides a rigid construction which can be readily and quickly assembled. All of the members are of relatively simple construction and can be made from either angle forms (as, for example, the uprights and the legs) or from blanks punched from sheet metal and shaped to final form by relatively simple bending operations.

The construction is such that all of the members may be readily assembled by riveting in certain cases and by bolts and nuts in other cases, so that the assembly can be effected relatively quickly and inexpensively.

The arrangement is such that the locker presents a neat and attractive appearance, particularly by reason of the fact that the forward faces of the cross members of the frame, the upright members of the frame, the forward panels of the doors and the forward face of the bottom closure member, all are flush. Moreover, the construction provides that the outer faces of the side walls 21 are flush with the outer faces of the sides of the uprights of the frame, so that the several locker units may be placed side by side in close-fitting arrangement without any gaps between adjacent locker units.

The frame is of very rigid construction which resists any distortion during installation or use to permit ready assembly therewith of the other members forming a locker. Particularly, the construction of the cross members is such as to provide a rigid support for the horizontal members of the locker so that those of the horizontal members which are adapted to support loads are capable of doing so without being distorted or displaced.

We claim:

1. A locker comprising a front frame including a pair of spaced upright members and at least one horizontal cross member connected between said upright members, each cross member being of general channel form and including an outer web carrying a first flange and a second flange in spaced relation, said first flange having a bent portion displaced inwardly toward the web of the cross member and upwardly, said displaced portion being spaced from the second flange, side panel members connected to said front frame, and a horizontal partition member having a portion disposed between the flanges of the cross member and resting upon said displaced portion of said first flange, and means securing said horizontal partition member to the second flange and to at least one of said panel members whereby weight of the partition member is distributed between said flanges of the cross member.

2. A locker as set forth in claim 1 wherein said horizontal partition member includes a main panel disposed horizontally, and said portion which is disposed between the flange and the displaced portion of said cross member takes the form of a flange extending perpendicularly to said main panel, said flange of the partition member resting on the displaced portion of the cross member to provide a horizontal planar surface continuity between the upper surface of the second flange and the upper surface of the horizontal partition member.

3. A locker as set forth in claim 1 wherein said horizontal partition member includes a main panel and flanges extending perpendicularly thereto at the edges thereof, a front panel, and the flanges of the partition member secured to said cross member and said side panels, respectively.

4. A locker comprising a front frame including a pair of spaced upright members and a horizontal cross member connected between said upright members, said cross member being of generally channel shape having a vertical web carrying inwardly directed spaced end flanges, one of said flanges having means for connection with a horizontal partition member disposed between said flanges, and one of the flanges of said cross member having at least a portion displaced inwardly toward the web of the cross member, said partition member being adapted to seat on said displaced portion when connected to the other of said flanges.

5. The invention as set forth in claim 4 wherein said displaced portion is folded towards and then away from the web of said cross member.

6. The invention as set forth in claim 4 wherein said displaced portion is folded back toward, but in spaced relation with, the web of said cross member and has its free edge portion projecting outwardly away from said web and spaced from the other flange.

References Cited in the file of this patent

UNITED STATES PATENTS

| | | |
|---|---|---|
| 914,685 | Waters | Mar. 9, 1909 |
| 1,373,825 | Magin | Apr. 5, 1921 |
| 1,591,198 | Wine | July 6, 1926 |
| 1,724,882 | Meyercord | Aug. 13, 1929 |
| 1,741,293 | Goidberg | Dec. 31, 1929 |
| 1,827,996 | Murray | Oct. 20, 1931 |
| 1,897,568 | Bales | Feb. 14, 1933 |
| 2,058,263 | Rosendale | Oct. 20, 1936 |
| 2,192,862 | Eagley | Mar. 5, 1940 |
| 2,339,339 | Kaser | Jan. 18, 1944 |
| 2,620,252 | Restivo | Dec. 2, 1952 |
| 2,667,401 | Knuth | Jan. 26, 1954 |
| 2,730,420 | Bruck | Jan. 10, 1956 |
| 2,749,199 | O'Connor | June 5, 1956 |
| 2,785,035 | Hammer | Mar. 12, 1957 |
| 2,866,676 | Goebel | Dec. 30, 1958 |